United States Patent
Schäfer

(10) Patent No.: US 8,480,347 B2
(45) Date of Patent: Jul. 9, 2013

(54) ORDER-PICKING SYSTEM HAVING A RACK TRANSPORT UNIT AND METHOD FOR OPERATING SUCH A SYSTEM

(75) Inventor: Gerhard Schäfer, Neunkirchen (DE)

(73) Assignee: SSI Schafer Noel GmbH Lager-und Systemtechnik

( * ) Notice: Subject to any disclaimer, the term of this patent is extended or adjusted under 35 U.S.C. 154(b) by 486 days.

(21) Appl. No.: 12/507,259

(22) Filed: Jul. 22, 2009

(65) Prior Publication Data

US 2009/0324378 A1 Dec. 31, 2009

Related U.S. Application Data

(63) Continuation of application No. PCT/EP2008/000531, filed on Jan. 24, 2008.

(30) Foreign Application Priority Data

Jan. 24, 2007 (DE) .................... 10 2007 005 561

(51) Int. Cl.
*B65G 1/00* (2006.01)
*B65G 1/10* (2006.01)
*B65G 1/12* (2006.01)
*B65G 65/02* (2006.01)

(52) U.S. Cl.
USPC ........... 414/281; 414/266; 414/267; 414/268; 414/277; 414/278; 414/285; 414/286; 414/807

(58) Field of Classification Search
USPC .................. 414/266, 267, 268, 277, 278, 281, 414/285, 286, 807
See application file for complete search history.

(56) References Cited

U.S. PATENT DOCUMENTS

| 2,661,100 | A  | * | 12/1953 | Ashford ................... 414/331.16 |
| 6,183,191 | B1 | * | 2/2001  | Mondie et al. ................ 414/807 |
| 6,602,037 | B2 | * | 8/2003  | Winkler ........................ 414/273 |
| 7,097,045 | B2 |   | 8/2006  | Winkler |
| 7,261,509 | B2 | * | 8/2007  | Freudelsperger ............. 414/269 |
| 2004/0191049 | A1 | * | 9/2004 | Winkler ..................... 414/791.6 |
| 2009/0129902 | A1 |   | 5/2009 | Schafer |

FOREIGN PATENT DOCUMENTS

| DE | 295 13 943      | 1/1996  |
| EP | 1 452 462 A2    | 2/2004  |
| WO | PCT/EP2005/005445 | 12/2005 |
| WO | WO 2007/134840 A1 | 5/2009 |

* cited by examiner

*Primary Examiner* — Scott Lowe
(74) *Attorney, Agent, or Firm* — McNeely, Hare & War LLP; Kevin J. McNeely

(57) ABSTRACT

An order-picking system and method includes a pallet warehouse (12), preferably in terms of a high-bay warehouse, being used as a supply warehouse dedicated to a plurality of, preferably different, packing units (40) which are stored, preferably by one sort only, on pallets (14) in the pallet warehouse (12); a tray warehouse (24) which is used as a picking buffer for supplying connected order-picking stations with packing units (40), wherein trays (38) are stored in the tray warehouse which have been loaded with a pallet layer of packing units (40) before; a conveyor (22) which transports from the pallet warehouse to the tray warehouse trays (38) which are respectively loaded with a pallet layer of packing units, particularly across longer distances; and at least a rack-transport unit (36) for trays (38), the rack-transport unit allowing receipt of a plurality of trays being respectively loaded with a pallet layer.

13 Claims, 4 Drawing Sheets

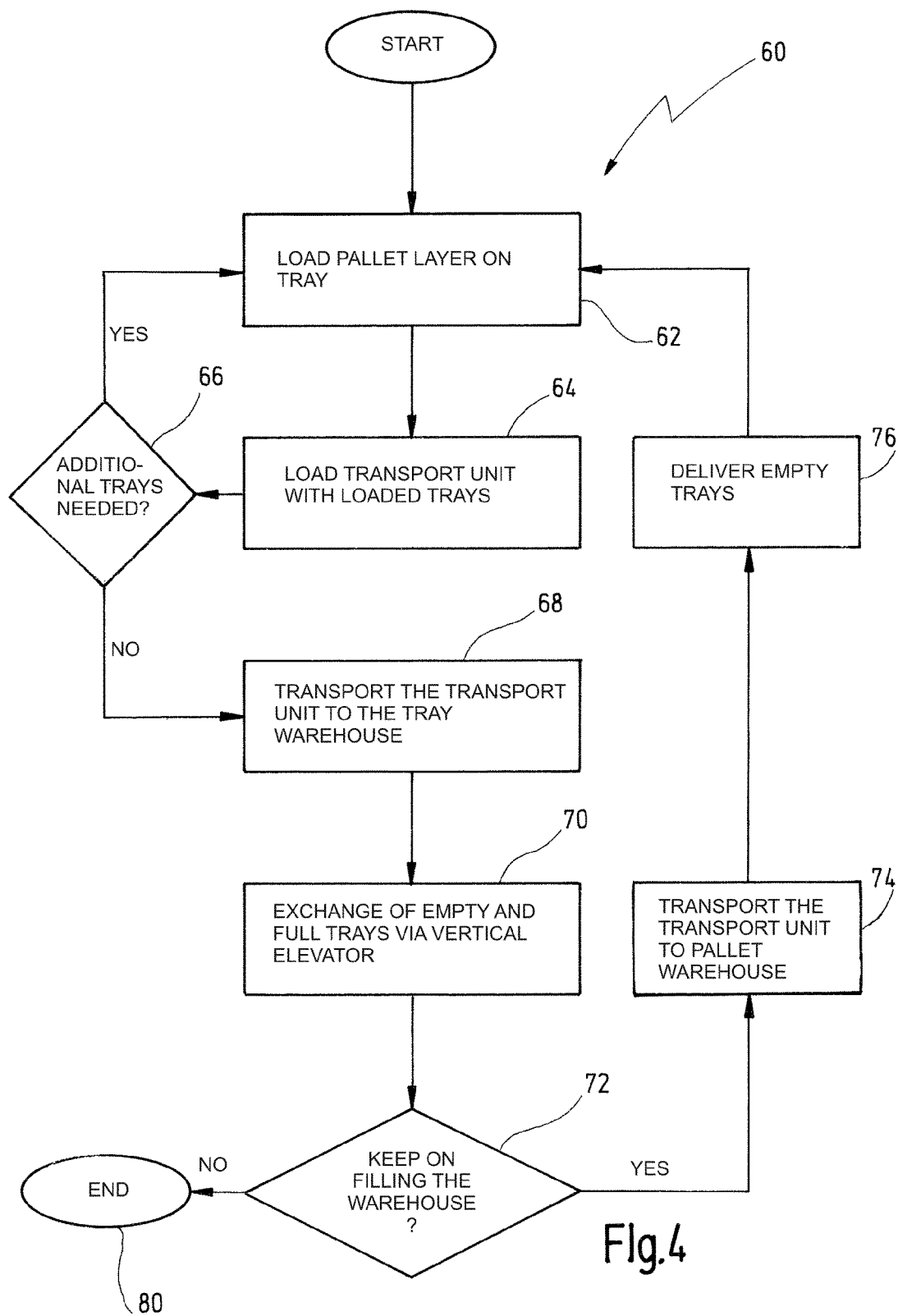

ORDER-PICKING SYSTEM HAVING A RACK TRANSPORT UNIT AND METHOD FOR OPERATING SUCH A SYSTEM

RELATED APPLICATIONS

This is a continuation application of the co-pending international application PCT/EP2008/000531 filed on 24 Jan. 2008, which claims the priority of the German patent application DE 10 2007 005 561 filed on 24 Jan. 2007, which are fully incorporated herewith by reference.

BACKGROUND OF THE INVENTION

The present invention relates to an order-picking system, and a method for operating the same, wherein many packing units have to be transported between a pallet warehouse and an order-picking warehouse, or an order-picking buffer.

RELATED PRIOR ART

From the prior art according to DE 295 13 943 U1 a container transport and provision device is known. A container transport and provision device is disclosed there, wherein the containers are to be transported from a container-storage rack to an assembly location, where the containers are presented and pieces located in the container are removed from the container and assembled. The automotive industry is a typical application field, wherein, for example, the interior of a vehicle, which is arranged in accordance with a customer's request, has to be transported to a corresponding body. Hence, the known transport and provision device is employed in an assembly-line production, where assemblies or similar are accommodated in containers in a high-bay warehouse and have to be brought to an assembly location.

These containers are retrieved from the rack warehouse by means of a storage and retrieval device. The storage and retrieval device delivers the retrieved container to a take-out conveyor line. Transporting of the containers outside of the warehouse happens by means of a known container conveyor.

An individual transport of containers by means of a container conveyor takes a long time due to long transport paths. Therefore, the DE 295 13 943 U1 proposes a container transport and provision device, wherein the device comprises a rack, for a number of containers, into which the respective containers can be inserted individually and from which the containers can be taken individually. The device comprises a pallet-like substructure and/or rollers or wheels on its bottom side. The device further comprises a reference grid, which is adapted to a reference grid of the container warehouse so that the containers can be loaded directly by means of the storage and retrieval device from the warehouse rack into the device, which is also called a "rack". The standard size of a container is 40×60×20 cm. The containers are kept laterally in the device by means of L-shaped support angles.

Recently, the applicant's developments have lead to a turning away from usage of containers for the sake of order picking. In accordance with a new concept, which has been conceived by the applicant of the present invention, trays, instead of containers, are now used as load supports. It is true that (single) trays are generally known. But the concept is novel in that the trays comprise receiving areas which are substantially as big as the area of a pallet such as a europool pallet (1200×800 mm). At the same time, the trays are respectively loaded with one pallet layer of packing units. The pallets from which pallet layers are taken down are, for example, stored in a pallet high-bay warehouse.

Since one pallet layer of packing units can weigh up to 250 kg, a pallet conveyor (roller track, chain conveyor, etc.) has to be used for transporting the trays. However, the usage of a pallet conveyor reduces the throughput, i.e. the number of trays which can be transported between a pallet warehouse and an order-picking buffer each hour. The order-picking process as such happens at the order-picking buffer.

The laid-open patent application DE 103 13 577 A1 entitled "Automatisiertes System und Verfahren zum Lagern und Kommissionieren von Artikeln" discloses an automated storage system for storing and picking articles delivered on input-load carriers, such as pallets, by means of a device (depalletizer) for the sake of an individual separation of article-packing units. Further, there is provided a tray warehouse for storing the single packing units on trays, a removal conveyor for removal and sequenced provision, for the sake of loading order-load carriers, of packing units, and a packing station for packing the packing units in accordance with a defined loading sequence onto an order-load carrier, e.g. for transporting same by truck.

SUMMARY OF THE INVENTION

Therefore, it is an object of the present invention to provide an order-picking system allowing a sufficient high transport throughput of heavy trays being loaded with pallet layers. Further, it is an object to provide a corresponding method for operating such an order-picking system.

These objects are solved by an order-picking system in accordance with the present invention, wherein the order-picking system comprises: particularly a pallet warehouse, preferably in terms of a high-bay warehouse being used as a supply warehouse for a plurality of, preferably different, packing units which are stored on pallets in the pallet warehouse; a tray warehouse, which is used as a picking buffer for supplying order-picking stations connected thereto with packing units, wherein trays are stored in the tray warehouse, which have been loaded before with a pallet layer of packing units; a conveyor transporting trays which are respectively loaded with a pallet layer of packing units, particularly over longer distances, from the pallet warehouse to the tray warehouse; and at least one rack-transport unit for trays wherein the unit is adapted to receive a plurality of trays each of which is loaded respectively with a pallet layer.

Also, the object is solved by a method for feeding a tray warehouse, wherein the tray warehouse can receive a plurality of trays, wherein the trays are respectively loaded with one pallet layer of packing units, the method comprising the following steps: rehandling of a pallet layer on an empty tray; bringing the so-loaded tray into a rack-transport unit; transporting the rack-transport unit by means of a conveyor to a handover point at the tray warehouse; and rehandling the trays from the rack-transport unit in laterally arranged vertical elevators which are arranged on longitudinal sides of racks of the tray warehouse.

By using a rack-transport unit, additional pallet-conveyor lines can be saved which normally have to extend between the pallet warehouse and the tray warehouse for obtaining the required throughput of 1000 trays an hour or more. Assuming a conventional throughput of 250 trays an hour, thus at least four pallet conveyors, preferably arranged on top of each other, would have to be employed for allowing transportation of sufficient trays from the pallet warehouse to the tray warehouse. Of course, the same applies to the return transport as well. A number of trays can be trans-ported with one movement from the pallet warehouse to the tray warehouse by the usage of the rack-transport unit. While merely one tray is transported in accordance with the prior art, a number of trays can be transported simultaneously by the usage of a rack-transport unit.

Further, it is preferred if a depalletizing device for rehandling pallet layers of packing units on empty trays.

Also, it is advantageous if further a shifting (conveyor) device is provided being arranged between the depalletizing device and the conveyor such that trays, which have just (in temporal terms) been loaded with one pallet layer, can be delivered directly to the rack-transport unit, if the rack-transport unit passes the shifting device.

Due to the usage of shifting devices the depalletizing device does not need to load empty trays within the transport unit and does not need to comprise additional devices, by means of which empty trays are loaded (filled) outside of the transport unit and subsequently moved into the transport unit. The depalletizing devices and the conveyor can be separated spatially from each other due to the provision of the shifting device. The depalletizing process can occur at another place in comparison to the filling of the transport units. The path between the depalletizing device and the rack-transport units can be covered, for example, by means of another conveyor which, in turn, delivers loaded trays to the shifting device.

Preferably, the shifting device is a conveyor displaceable in a vertical direction, or a storage machine displaceable horizontally and vertically.

A conveyor displaceable in a vertical direction can be combined with the other conveyor in a simply manner. Loaded trays are transported onto the vertical conveyor by the other conveyor, wherein the vertical conveyor is subsequently shifted in a height direction for delivering the loaded tray to a predetermined compartment of the transport unit. Conversely, an empty tray can be removed from the transport unit by means of the vertically displaceable conveyor, and delivered to the other conveyor for being loaded at a depalletizing device.

Alternatively, a storage machine can be employed which is displaceable horizontally and vertically. Such storage machines are sold by the applicant of the present invention under the product name "Schafer Quad Shuttle" (SQS). An SQS can be displaced in both directions, horizontally and vertically, and has one or more load suspension devices. Different compartments, which are arranged on top of each other, can be traveled—to in a vertical direction by a transport unit. Different compartments of the same transport unit can be traveled—to in a horizontal direction, if tray compartments being arranged side-by-side are present in the transport unit. Further, different transport units can be loaded with trays in this manner as well, provided that the transport units are arranged one after the other in the area of the range of the SQS. By the aid of the horizontally and vertically displaceable storage machine, one sequencing stage can be implemented, since the storage machine is not only capable of delivering a tray at a predefined height, but can load different transport units as well. This influences the unloading of the transport units in the tray warehouse.

The more a transport unit is arranged—relative to a transport direction of the conveyor line—in the front, the faster it will arrive in the tray warehouse for loading the tray warehouse once again with new trays.

In accordance with another preferred embodiment a conveyor loop is arranged in the region of the depalletizing device allowing to discharge the transport unit from the conveyor line for the purpose of loading full trays, and for allowing to introduce subsequently the transport unit into the conveyor line for the purpose of transporting same towards the tray warehouse.

By providing conveyor loops in the region of the depalletizing devices, a main flow on the conveyor line is not disturbed during loading and unloading the transport units. As soon as a transport unit is filled (again) with trays, it can be guided back on the (main) conveyor for being transported to the tray warehouse. This measure, in turn, increases the throughput of trays which can be transported each hour between the pallet warehouse and the tray warehouse.

In accordance with a particular embodiment the tray warehouse comprises a plurality of warehouse racks which are fed with trays via lateral vertical elevators, wherein the vertical elevators are arranged along longitudinal sides of the warehouse racks.

The vertical elevators are arranged in rack aisles of the tray warehouses. Such rack aisles are fed with transport units via conveyor branches. Die conveyor branches, in turn, are connected to the main conveyor so that the transport of transport units on the conveyor can be performed in an undisturbed manner. Similarly to the above-mentioned conveyor loops, the conveyor branches thus increase the throughput, since traffic jams are prevented.

Further, it is preferred if the vertical elevators are connected to the conveyor branches in regions thereof over conveyor loops as well, wherein the conveyor branches in turn are connected to the conveyor.

By this measure, the throughput of transport units in the conveyor branches is in turn increased, since also there conveyor loops are provided which are relaxing the "traffic" in the conveyor branch and avoid traffic jams.

Additionally, it is preferred if a tray comprises a loading area which substantially corresponds to an area of a pallet, and if the tray can carry loads of up to 250 kg.

Particularly, each transport unit can receive at least four loaded trays in a vertical direction, and can receive multiple trays side-by-side in a horizontal direction.

It is clear that the above-mentioned and hereinafter still to be described features are not only usable in the respectively given combination, but also in other combinations or alone, without departing from the scope of the present invention.

BRIEF DESCRIPTION OF THE DRAWINGS

Embodiments of the invention are depicted in the drawings and will be explained in more detail in the following description.

FIG. 4 shows a flow chart of a method in accordance with the present invention.

PREFERRED EMBODIMENTS OF THE INVENTION

Figure 1:
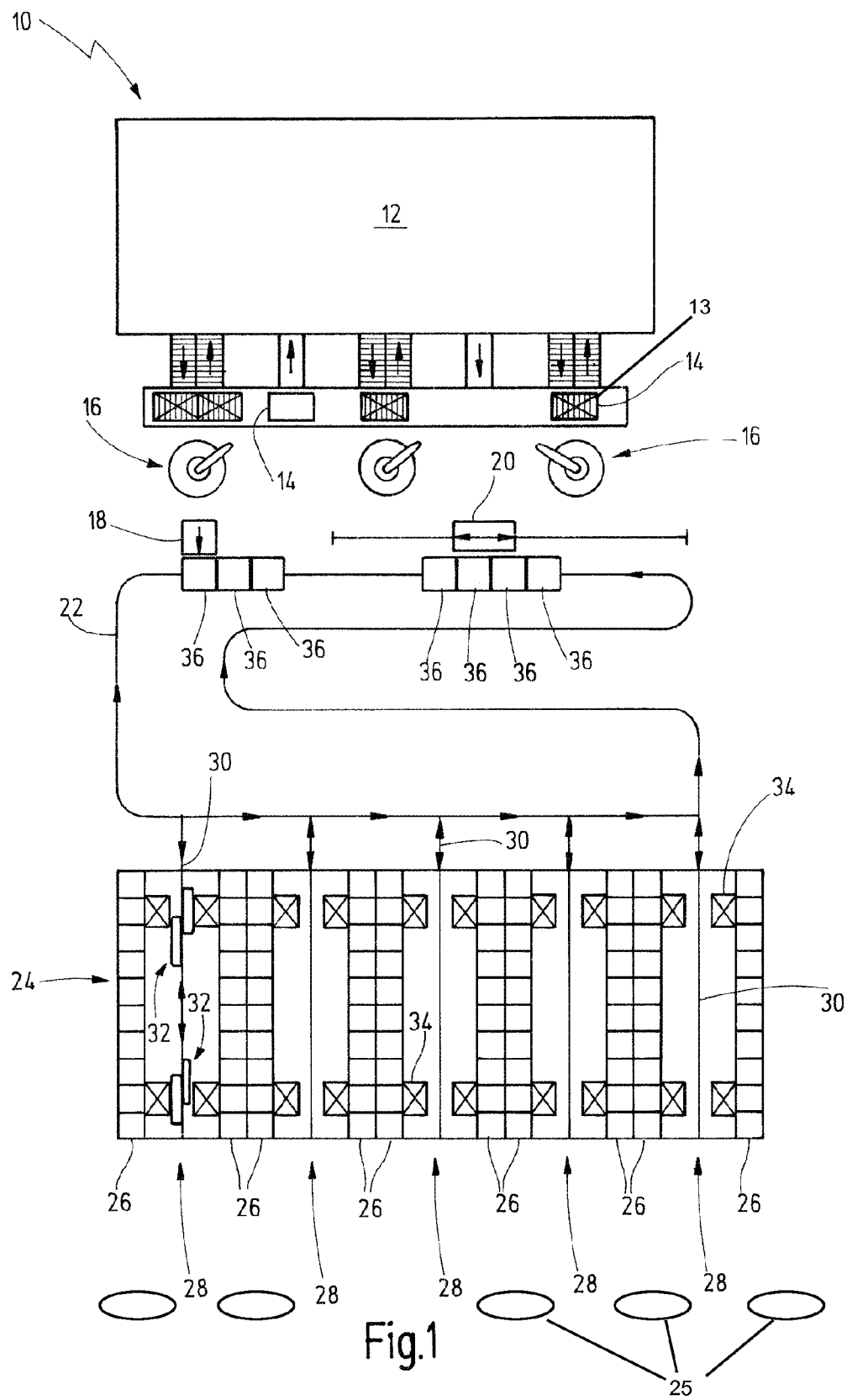
FIG. 1 shows a schematic top view on an order-picking system in accordance with the present invention.

The present invention can be integrated ideally into the concept of the applicant according to which pallet-sized trays are respectively loaded with a, preferably one, pallet layer of packing units for being used in an order-picking system which is operated similar to a conventional order-picking system which is operated with conventional containers.

A tray warehouse adapted to such trays is disclosed in the German patent application DE 10 2006 025 620 A1, the entire content of which is integrated herewith by reference. A rack-integrated packing station and a corresponding order-picking method is disclosed in the German patent application DE 10 2006 025 619, the entire content of which is integrated herewith by reference. The trays which are loaded with pallet layers are also used at separate packing stations which are described in the German patent application DE 10 2006 025 617, the entire content of which is integrated herewith by reference. A method for operating an order-picking system with containers, instead of trays, being loaded with pallet layers is described in the German patent application DE 10 2006 025 618, the entire content of which is integrated herewith by reference.

When describing the following figures, same elements are designated with same reference numerals. An order-picking system in accordance with the present invention is generally designated by 10.

The order-picking system 10 in accordance with the invention is schematically illustrated in a top view of FIG. 1.

The order-picking system 10 comprises a pallet warehouse 12 where pallets 14 are stored, wherein empty pallets are illustrated by white rectangles and loaded pallets 14 are illustrated by dark rectangles in FIG. 1. The pallets 14 are unloaded by means of depalletizing devices 16, which in turn load pallet layers onto trays (not depicted here), which are positioned, for example, on shifting devices 18, 20.

Alternatively, the pallet warehouse 12 could be omitted as well. In this case, pallets could be loaded, for example, directly from a truck or a goods receipt, and could be depalletized. Further, it is possible to load goods, which were just produced, onto trays, i.e. a production site instead of a pallet warehouse could be provided as well.

The trays which are respectively loaded with one pallet layer are transported to a tray warehouse 24 by means of a (main) conveyor 22 (cf. solid line). The tray warehouse 24 functions as an order-picking buffer. Trays stored in the tray warehouse 24 are transported to packing stations or order-picking stations 25, where packing units 13 can be removed and packed on shipping carriers for processing customer's picking orders. It is clear that the conveyor 22 does not pass a pallet warehouse 12 if same is not present. The conveyor 22 passes a location where (filled) trays can be received.

The tray warehouse 24 is explicitly described in the above-mentioned German patent application and comprises a plurality of racks 26 which are arranged individually or back-to-back. Rack aisles 28 are located between the racks 26, which comprise a plurality of tray-storage compartments. With the embodiment shown in FIG. 1, conveyor branches 30, which are arranged centrally, extend along the rack aisles 28. The conveyor branches 30 are respectively connected to the conveyor 22 (roller track, chain conveyor, etc.), for receiving loaded trays, which are incoming from the pallet warehouse 12, in order to be stored in the racks 26. For this purpose laterally arranged vertical elevators 34 are arranged along the longitudinal sides of the racks 26 within the rack aisles 28. It is referred to the above-mentioned patent applications for further details.

So-called rack-transport units 36 are used for allowing conveyance of more trays per hour between the pallet warehouse 12 and the tray warehouse 24, wherein no additional (pallet) conveyor 22 needs to be provided.

The rack-transport units 36 represent "small rack units", which are formed similar to segments (compartments) of the racks 26, and are adapted to receive a number of trays. The rack-transport units 36 preferably comprise a frame to which horizontally extending support rails are mounted, preferably in different planes, allowing receipt of a number of trays one on top of the other. The rack-transport units 36 ideally represent "small" racks comprising a number of storage compartments which are arranged on top of each other and/or side-by-side. It is clear that also rack-transport units could be used, which merely comprise storage compartments arranged side-by-side, or which comprise a number of storage compartments, which in turn are arranged in columns and rows.

The rack-transport units 36 are formed such that trays can be received, the base area of which is substantially as great as a base area of the pallets of the pallet warehouse 12 from which pallet layers of packing units (not depicted) are re-loaded (rehandled) onto the trays. In this connection, it is particularly to be considered that individual pallet layers can weigh up to 250 kg so that the frame of the rack-transport unit 36 has to be adapted correspondingly.

Further, it is clear that besides Europool pallets (1200×800 mm2) also other (standard) pallet sizes can be used.

Several rack-transport units 36 are illustrated in FIG. 1. The rack-transport units 36 are here located in the region of the depalletizing devices 16 for being loaded with trays. For this purpose, pallets 14 are retrieved from the pallet warehouse 12, preferably via branches, which in turn are connected to a pre-zone being arranged between the pallet warehouse 12 and the depalletizing devices 16. The depalletizing devices 16 respectively remove one pallet layer and put the pallet layer on empty trays waiting on the shifting devices 18, 20.

It is clear that the depalletizing devices 16 do not need to be pivoted for shifting a pallet layer. Likewise, it would be possible to lift a pallet layer, for example, merely briefly to move an empty tray therebeneath, and subsequently lower the lifted pallet layer again. A tray loaded in this manner could be brought to the shifting devices 18, 20 by means of a suitable conveyor unit, in order to be loaded subsequently in empty rack-transport units 36.

Conversely, empty trays can be removed from the rack-transport units 36 by means of the shifting devices 18, 20, particularly when they return from the tray warehouse 24 holding empty trays. In this manner it is ensured that there is a permanent exchange of empty and loaded trays between the pallet warehouse 12 and the tray warehouse 24.

Figure 2:
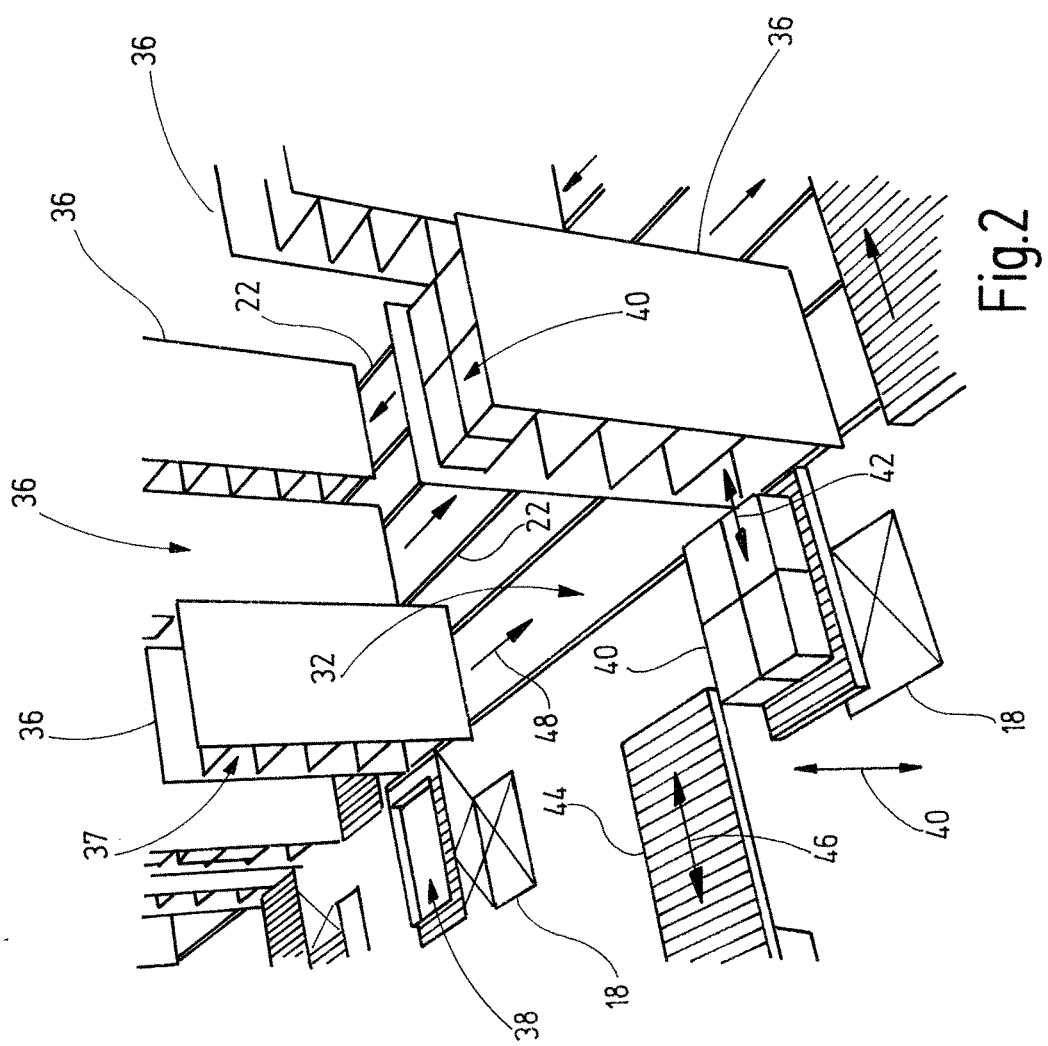
FIG. 2 shows a perspective schematic view of a region of the order-picking system of FIG. 1 where transport units are loaded with trays.

A perspective schematic view on a region in the vicinity of the depalletizing devices 16 of FIG. 1 is shown in FIG. 2.

Three sections, being arranged parallelly to each other, of a conveyor 22 can be seen in FIG. 2. A flow and movement direction of the rack-transport units 36 is illustrated by means of dark arrows (cf. for example arrow 48). A return-flow line of the conveyor 22 is shown in a right-hand part of FIG. 2 (in the rear part thereof), wherein the empty rack-transport units 36 are transported from the tray warehouse 24 to the depalletizing devices 16 via the return-flow line. The central section of the conveyor 22 is operated in an opposite direction, which is comparable to the region being arranged opposite to the shifting device 20 in FIG. 1.

Deviant to FIG. 1, FIG. 2 illustrates an order-picking loop 32 (similar to a "railroad" station) beside the main conveyor 22 for discharging rack-transport units 36 from the main conveyor 22, the loop 32 comprising conveyor elements. For this purpose, discharging devices (not illustrated here) are provided. After a discharge process has taken place, empty compartments 37 of the rack-transport units 36 can be filled with loaded trays 38, in order to allow subsequent re-injection on the main conveyor 22 by means of injecting devices (not shown).

The loading of the rack-transport units 36, which comprise a plurality of tray compartments 37, preferably happens by means of vertically displaceable conveyor 18, which can be lifted and lowered in a vertical direction 40 and convey horizontally. Removal of the trays, and loading of the trays happens in a horizontal direction as indicated by an arrow 42 in FIG. 2.

In a lower part of FIG. 2, another conveyor 44 is illustrated, which can be used for transporting loaded trays 38 from a loading location, where the depalletizing device 16 is operated in the vicinity thereof, to the shifting device 18. For this purpose, the shifting conveyor 18 is moved to the same height as the other conveyor 44 in order to allow receipt of the loaded tray 38. Subsequently, the shifting conveyor 18 is moved to an arbitrary height, lower in the illustration of FIG. 2, in order to fill a predetermined compartment 37 of the rack-transport unit 36.

After the rack-transport unit 36 is filled, it can be delivered again to the conveyor 22 by means of the injecting device, in order to be transported to the tray warehouse 24.

Alternatively or additionally to the vertical shifting conveyor 18, storage machines (not illustrated), such as SQS or STS (Schäfer Tray System), can be used which are adapted for handling trays. A storage machine is displaceable in both a vertical direction 40 and a horizontal direction.

It is supposed that a number of rack-transport units 36 are lined up side-by-side for allowing to be loaded by the shifting devices 18. Different rack-transport units 36 can be loaded simultaneously by means of one storage machine. This allows sequencing, i.e. here the sequence of the trays, as they are coming-in to the tray warehouse 24, can be changed and affected. Trays having a higher priority can be loaded in the rack-transport units 36 which are arranged closer to an injecting device than other rack-transport units 36. Also, the distribution of trays to different aisles (or racks) of the tray warehouse 24 can be taken into account. For example, if a pallet holding articles of one sort only is resolved, then this results in a plurality of trays all being loaded with the same type of article. Then, these trays can be loaded in different rack-transport units, in order to travel to different aisles only once. If a rack-transport unit would be loaded with articles of one type only, then several racks would have to be headed for, in order to obtain a satisfying distribution of the articles in the tray warehouse. Therefore, a mixture of articles in the rack-transport units is desirable.

It is clear that, if no loop 32 is provided, the sequencing can also happen directly on the conveyor 22 (cf. situation of FIG. 1).

Further, it is to be noted that the conveyor 22 of FIG. 2 is of the chain conveyor type which is suitable to transport pallets. Other types of pallet conveyors are possible. Alternatively, for example, a roller track could be used as well. The conveyor 22 is to be adapted for the purpose of transporting heavy goods.

Figure 3:
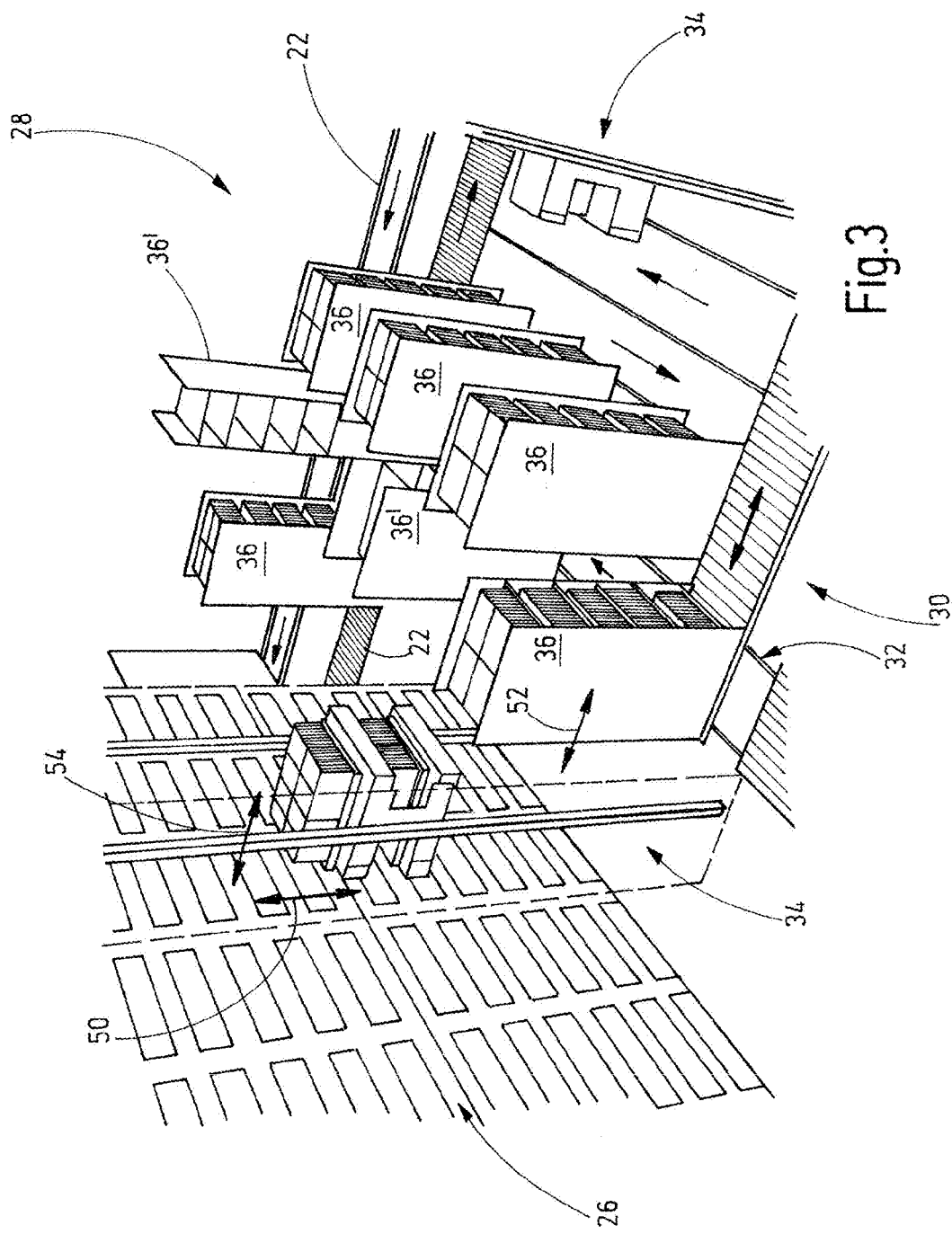
FIG. 3 shows a perspective schematic view into a rack aisle of a tray warehouse, as it is comprised by the order-picking system of FIG. 1.

FIG. 3 schematically shows a perspective view into a rack aisle 28 (cf. FIG. 1). There, one is looking from the inside of the rack aisle 28 towards an outer edge where the conveyor 22 delivers filled transport units 36, in order to deliver them to conveyor branches 30, where optionally conveyor loops 32 can be provided.

In the left part of FIG. 3, a longitudinal side of a rack 26 is illustrated. One of the vertical elevators 34 is adjacent to the longitudinal side of the rack 26. The vertical elevator 34 is provided with at least one load suspension device by which trays can be retrieved from storage compartments and tray compartments 37, or can be delivered thereto. The vertical elevator 34 is displaceable in a vertical direction 50, and exchanges trays with the rack 26 in a horizontal direction (cf. arrow 54) and the rack-transport units 36 (cf. arrow 52).

FIG. 4 shows a flow chart of a method in accordance with the present invention.

In a first step 62, pallet layers are loaded on empty trays for being loaded subsequently in rack-transport units in a step 64. Then, it is requested in step 66, whether additional trays are needed in order to load the rack-transport unit. If so, it is returned to the step 62. If not, the rack-transport unit is transported in step 68 to the tray warehouse. In a step 70, empty and loaded trays are exchanged by means of the vertical elevators. If it is determined in another step 72 that other packing units are needed, then the rack-transport unit holding the empty trays is transported back towards the pallet warehouse (cf. step 54), and the empty trays are delivered for being loaded again (cf. step 76). If no additional packing units are needed in step 72, the method ends (cf. step 80).

I claim:

1. An order-picking system comprising:
a pallet warehouse, which is used as a supply warehouse for a plurality of different packing units, which are stored on pallets in the pallet warehouse wherein each of the pallets holds packing units of one sort only;
a depalletizing device adjacent to the pallet warehouse to rehandle respectively one pallet layer of the packing units on empty trays, each tray being approximately pallet-sized in area;
a tray warehouse, which is used as a picking buffer in order to feed connected order-picking stations with the packing units, wherein the trays which have been loaded with the respective one pallet layer of packing units before are stored in the tray warehouse;
a conveyor for transporting the trays, which are loaded with the respective one pallet layer of packing units, across longer distances from the pallet warehouse to the tray warehouse;
at least one multiple-level rack-transport unit for transporting the approximately pallet-sized trays between the pallet warehouse and tray warehouse and adapted to receive a plurality of trays each of which is loaded with the respective one pallet layer of packing units, wherein the at least one rack-transport unit is conveyed on the conveyor to the tray warehouse; and a shifting device which is arranged between the depalletizing device and the conveyor such that the trays, which have just been loaded with the respective one pallet layer, can be shifted directly in the at least one rack-transport unit, when the at least one rack-transport unit on the conveyor passes the shifting device, wherein the shifting device is a conveyor displaceable in a vertical direction.

2. The order-picking system of claim 1, wherein the pallet warehouse is a high-bay warehouse.

3. The order-picking system of claim 1, wherein the conveyor is of a pallet conveyor type.

4. The order-picking system of claim 1, wherein a conveyor loop is arranged in a vicinity of the depalletizing device for allowing discharge of the at least one rack-transport unit from the conveyor, in order to load the at least one rack-transport unit, and injection of the at least one rack-transport unit to the conveyor for transporting the at least one rack-transport unit towards the tray warehouse.

5. The order-picking system of claim 4, wherein vertical elevators are connected to conveyor branches by means of conveyor loops, which in turn are connected to the conveyor.

6. The order-picking system of claim 1, wherein the tray warehouse comprises a plurality of warehouse racks being supplied by laterally arranged vertical elevators with the trays, wherein the vertical elevators are arranged on longitudinal sides of the warehouse racks.

7. The order-picking system of claim 6, wherein the vertical elevators are connected to conveyor branches by means of conveyor loops, which in turn are connected to the conveyor.

8. The order-picking system of claim 1, wherein each of the trays comprises a loading area which substantially corresponds to an area of a pallet, and wherein each of the trays can carry a load up to 250 kg.

9. The order-picking system of claim 1, wherein the at least one rack transport unit is adapted to receive in a vertical direction at least four of the loaded trays.

10. The order-picking system of claim 9, wherein the at least one rack-transport units is adapted to receive in a horizontal direction a number of the trays in a side-by-side manner.

11. A method for feeding a tray warehouse, which is adapted to receive a plurality of trays each tray being approximately pallet-sized in area, with the trays being loaded with respectively one pallet layer of packing units, comprising the steps of:

rehandling the respectively one pallet layer of packing units on an empty tray;

moving the so-loaded tray in a multiple-level rack-transport unit between the pallet warehouse and tray warehouse;

transporting the rack-transport unit to a handover point at the tray warehouse by means of a conveyor;

rehandling the so-loaded tray from the rack-transport unit into laterally arranged vertical elevators which are arranged on longitudinal sides of racks of the tray warehouse; and shifting the trays which have just been loaded with the respective one pallet layer directly in the at least one rack-transport unit when the at least one rack-transport unit on the conveyor passes the shifting device which is arranged between the depalletizing device and the conveyor;

wherein the step of moving the loaded tray is performed by means of a storage machine which is vertically and horizontally displaceable, the storage machine being arranged between the conveyor, which transports the rack-transport unit to the tray warehouse, and a depalletizing device, wherein the shifting device is a conveyor displaceable in a vertical direction.

12. The method of claim 11, wherein a number of transport units are arranged near the storage machine, one behind the other for being loaded with loaded trays, and wherein the storage machine loads the rack-transport unit in a sequenced manner.

13. The method of claim 11, wherein the rack-transport unit is introduced in a conveyor loop for being loaded with the trays, the conveyor loops being connected to the conveyor.

* * * * *